Aug. 31, 1926.

H. BRIER

TIRE INFLATION GAUGE

Filed Dec. 24, 1923

1,597,668

Inventor
Henry Brier
By
Attorneys

Patented Aug. 31, 1926.

1,597,668

UNITED STATES PATENT OFFICE.

HENRY BRIER, OF DARTFORD, ENGLAND.

TIRE-INFLATION GAUGE.

Application filed December 24, 1923, Serial No. 682,400, and in Great Britain March 21, 1923.

This invention relates to inflation gauges for pneumatic tires and has for its object to provide an instrument which will register as nearly as possible the degree of inflation of the tire, and thus indicate when the tire is properly inflated, the indications of said gauge being, in effect, measurements of the indentation or resistance to indentation of the outer wall of the tire.

Several embodiments of the invention are illustrated in the accompanying drawings in which Figs. 1, 2 and 3 are, respectively, a plan, a longitudinal section and a cross section of a gauge including a tire-engaging plunger provided with a rack meshing with a pinion connected with an arm engageable with a pointer traversing a dial.

Figure 1:
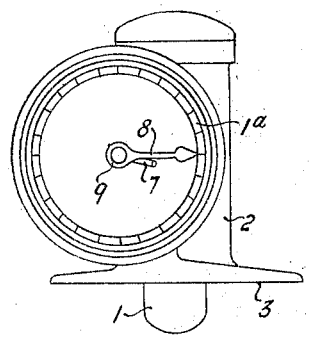

Each of the gauges shown in Figs. 1 to 8 comprises a plunger 1 mounted within a casing 2 having a laterally extending abutment face 3 penetrated by the operative end of the plunger and adapted to be brought against the outer wall of a tire.

The plunger 1 is urged by a spring 4 in opposition to which it is moved inwardly of the casing 2 by reaction pressure of the tire.

In the embodiments illustrated in Figs. 1, 2, 3 and 4 the plunger is formed at 5 as a rack engaging a pinion 6 the arbor of which is revolubly mounted in the casing 2 and provided with an arm 7 having a one-way connection with a loose pointer 8, the arrangement being such that the extent of inward movement of the plunger is registered by the pointer on the dial 1ª. For setting the pointer at zero there is provided, in the embodiment illustrated in Figs. 1, 2 and 3, a finger knob 9 connected to the pointer; for setting the pointer at zero in the embodiment illustrated in Fig. 4 there is provided a milled quadrant 9ª integral with the pointer, the marginal edge of which quadrant projects through a gap in the casing.

Figure 5:
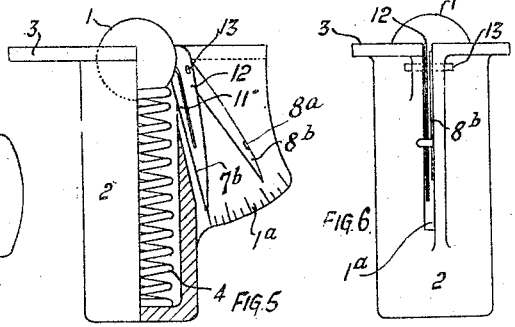
Figs. 5 and 6 are elevations at right angles to one another of a gauge including a spring-pressed ball engaged by arms cooperating with a pointer, Fig. 5, being partly in section.
Figure 6:
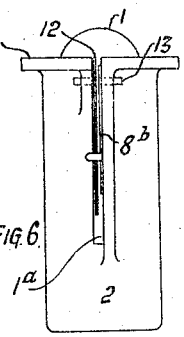

Referring to the embodiment illustrated in Figs. 5 and 6, the plunger is constituted by a ball 1 engaged by the arms 11, 12 of a bifurcated spring lever 7ᵇ fulcrumed at 13 on the casing and having a one-way connection with a pointer 8ᵇ. The stop 8ª on the lever 8ᵇ provides this one way connection with the deflecting spring lever 7ᵇ. The arms 11, 12 are shaped to conform with the spherical surface of the ball, the arm 11 being acted on by the ball when the ball is depressed and the arm 12 being acted on by the ball when the ball is being restored to normal position by the spring 4. The arm 11 is so shaped at its end that when the ball is depressed the lever 7ᵇ is moved outwardly by engagement with the ball and the adjacent end of the lever, while on the outward movement of the ball, the short end of the lever 12 is pushed laterally, causing the long end to move inwardly over the scale. The one-way action between the levers 7ᵇ and 8ᵇ is insured by a stop (not marked) on the lever 8ᵇ. It will be seen that the tubular body 2 is split and that the levers 7ᵇ and 8ᵇ are mounted in the slit formed.

In the operation of the guage shown in Figs. 5 and 6, the ball 1 is depressed by the reaction of the wall of the tire in opposition to the spring 4, the bifurcated spring lever 11, 12 and therewith the pointer 8ᵇ being caused to traverse the scale 1ª. The pointer is subsequently set at zero by manual operation.

Figure 7:
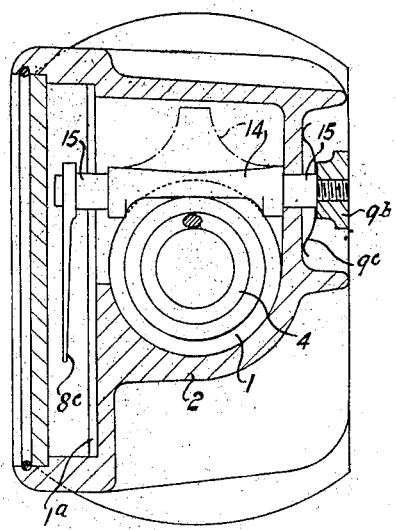
Figs. 7 and 8 are sections at right angles to one another of a gauge including a cam-controlled pointer.
Figure 2:
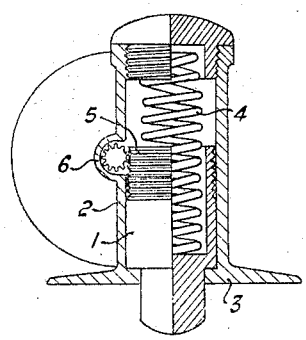
Figure 8:
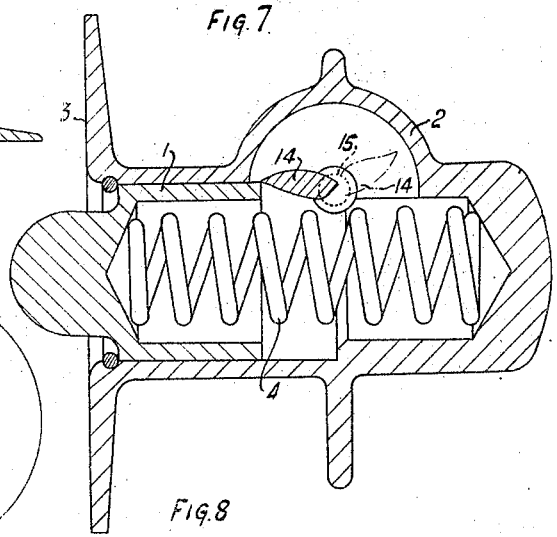
Figure 3:
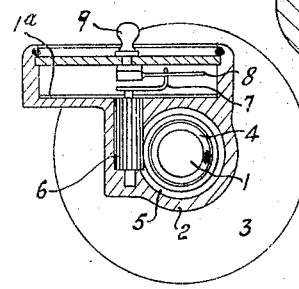
Figure 4:
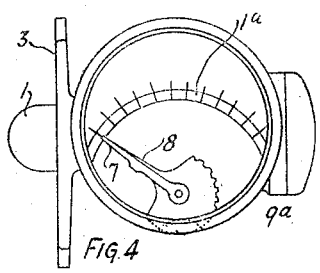
Fig. 4 is a plan of a gauge having internal mechanism similar to that illustrated in Figs. 2 and 3 and having a pointer operated by an arm and provided with a partly exposed milled quadrant for engagement with the finger.

In the embodiment illustrated in Figs. 7 and 8, the pointer 8ᶜ is fixed to an arbor 15 mounted for rocking movement in the casing 2 and carrying a follower cam 14 engageable by the plunger 1, the arrangement being such that the movement of the plunger 1 is accompanied by corresponding movement of the pointer across the dial 1ª. It will be seen that the cam 14 has a one-way operative connection with the plunger 1, so that, when the plunger 1 is restored to normal position by the spring 4, the pointer remains at maximum indication. A spring washer 9ᶜ on the arbor 15 offers sufficient friction to prevent unintended movement of the pointer. For setting the pointer at zero there is provided a milled disc 9ᵇ mounted on the arbor 15.

The configuration of the cam 14 is such that the movement of the pointer in proportion to the travel of the plunger 1 is gradually increased as the plunger moves over the innermost part of its range.

What I claim is:—

1. An inflation gauge for pneumatic tires comprising a casing having a part engageable with the outer wall of the tire, a yielding resistance member within said casing, a tire-engaging plunger projecting beyond said casing part and movable in said casing in opposition to said resistance, an indicator having a one-way connection operable only on movement of said plunger inwardly of the casing and a scale for the indicator graduated to indicate the degree of inflation of the tire.

2. An inflation gauge for pneumatic tires comprising a casing having a part engageable with the outer wall of a tire, a spring within said casing, a tire-engaging plunger projecting beyond said casing part and movable in said casing in opposition to said spring to an extent determined by resistance to indentation offered by the tire, an angularly movable indicator operatively connected to said plunger and a scale for the indicator graduated to indicate the degree of inflation of the tire.

3. An inflation gauge for pneumatic tires comprising a casing having a part engageable with the outer wall of the tire, a resistance member within the casing, a tire-engaging plunger projecting beyond said casing part and movable in said casing in opposition to said resistance to an extent determined by the resistance to indentation offered by the tire to said plunger, an angularly movable indicator, means for transmitting movement of said plunger to said indicator and a scale for the indicator graduated to indicate the degree of inflation of the tire.

4. An inflation gauge for pneumatic tires comprising a casing having an abutment face adapted to be brought against the outer wall of a tire, a tire-engaging plunger protruding beyond said face and movable inwardly of said casing by the reaction pressure of the tire, a spring within said casing urging said plunger in outward direction, an indicator, a one-way connection displaced by compression of said spring between said plunger and said indicator operable only on movement of the plunger inwardly of the casing and a scale cooperating therewith graduated to indicate the degree of inflation of the tire.

5. In an inflation gauge for pneumatic tires in combination, a casing having an abutment face adapted to engage the outer wall of the tire, a tire-engaging plunger protruding beyond said face and movable inwardly of said casing by the reaction pressure of the tire, a spring within said casing urging said plunger outwards but compressible by said plunger to balance the pressure of the tire against said plunger, an angularly movable indicator, one-way motion-transmitting connection displaced by compression of said spring, operable only on movement of the plunger inwardly of the casing between said plunger and said indicator and a scale for the indicator graduated to indicate the degree of inflation of the tire.

6. An inflation gauge for pneumatic tires, comprising a tire-engaging abutment adapted to engage the outer wall of the tire, a tire-engaging member movable relatively to said abutment, resilient means pressing said member against the tire, said means being compressible on relative movement of said member and said abutment to balance the reaction pressure of the tire, an indicating device movable to an extent determined by the compression of said resilient means and a scale cooperating therewith graduated to indicate the degree of inflation of the tire.

In testimony whereof I have signed my name to this specification.

HENRY BRIER.